United States Patent [19]

Gregoric

[11] 4,240,483

[45] Dec. 23, 1980

[54] SPOKED WHEEL

[76] Inventor: Bran F. Gregoric, 4685 Central Blvd., Ann Arbor, Mich. 48104

[21] Appl. No.: 62,751

[22] Filed: Aug. 1, 1979

Related U.S. Application Data

[63] Continuation-in-part of Ser. No. 905,658, May 15, 1978, abandoned.

[51] Int. Cl.³ ............................................. B60B 9/04
[52] U.S. Cl. .................................... 152/75; 152/79; 152/84; 152/380; 180/7 R; 301/74
[58] Field of Search ...................... 152/69, 75, 79, 84, 152/379.3, 380; 180/7 R; 301/71, 72, 73, 74, 55, 56, 58, 59, 67

[56] References Cited

U.S. PATENT DOCUMENTS

| Re. 13,364 | 1/1912 | Murray | 152/69 |
|---|---|---|---|
| 442,456 | 12/1890 | Post | 301/56 |
| 504,284 | 8/1893 | Smith et al. | 152/380 |
| 856,100 | 6/1907 | Perruchon | 152/12 |
| 1,345,827 | 7/1920 | Bohannon | 152/12 |
| 1,552,379 | 9/1925 | Bakus | 152/69 X |
| 2,404,974 | 7/1946 | Martin | 152/6 X |
| 3,311,149 | 3/1967 | Mathiesen | 152/7 |

FOREIGN PATENT DOCUMENTS 544 of 1891 United Kingdom .................... 152/380

*Primary Examiner*—John J. Love
*Assistant Examiner*—D. W. Underwood
*Attorney, Agent, or Firm*—Olsen and Stephenson

[57] ABSTRACT

A wheel for lessening rolling resistance and other forces that retard the rolling of the wheel consisting of a circular wheel rim, a hub member positioned concentrically within the wheel rim and a spoke arrangement connecting the wheel rim with the hub member for storing and releasing externally applied energy to provide propulsive torque to the wheel. The spoke arrangement is formed from a single strand of wire that is wound around the hub and is extended to the rim to form spoke loop portions. As the wheel is rolled over a supporting surface, each spoke loop portion is flexed as the portion of the wheel adjacent thereto engages the roadway. As that portion of the wheel approaches a point where it breaks contact with the roadway the spoke portion closest thereto unflexes imparting a torque on the wheel in the direction in which it is being rolled.

5 Claims, 12 Drawing Figures

U.S. Patent  Dec. 23, 1980  Sheet 1 of 3  4,240,483
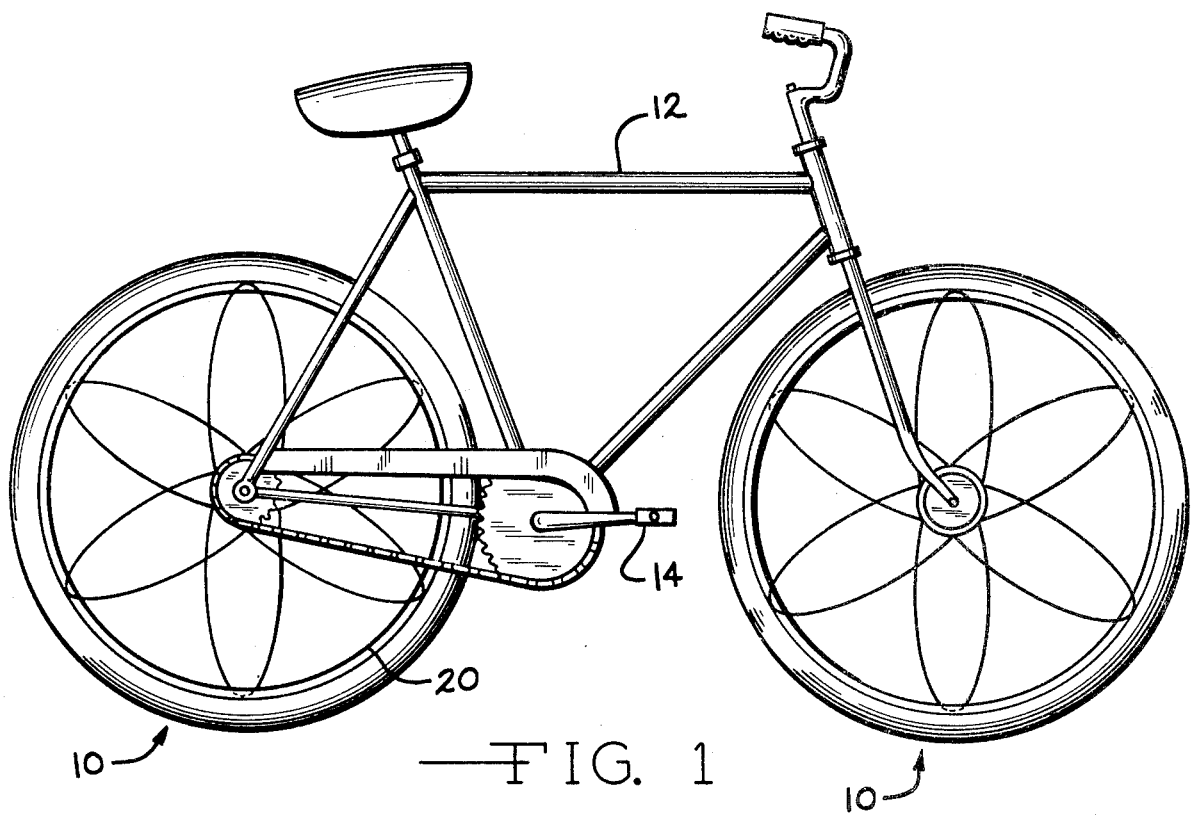
FIG. 1
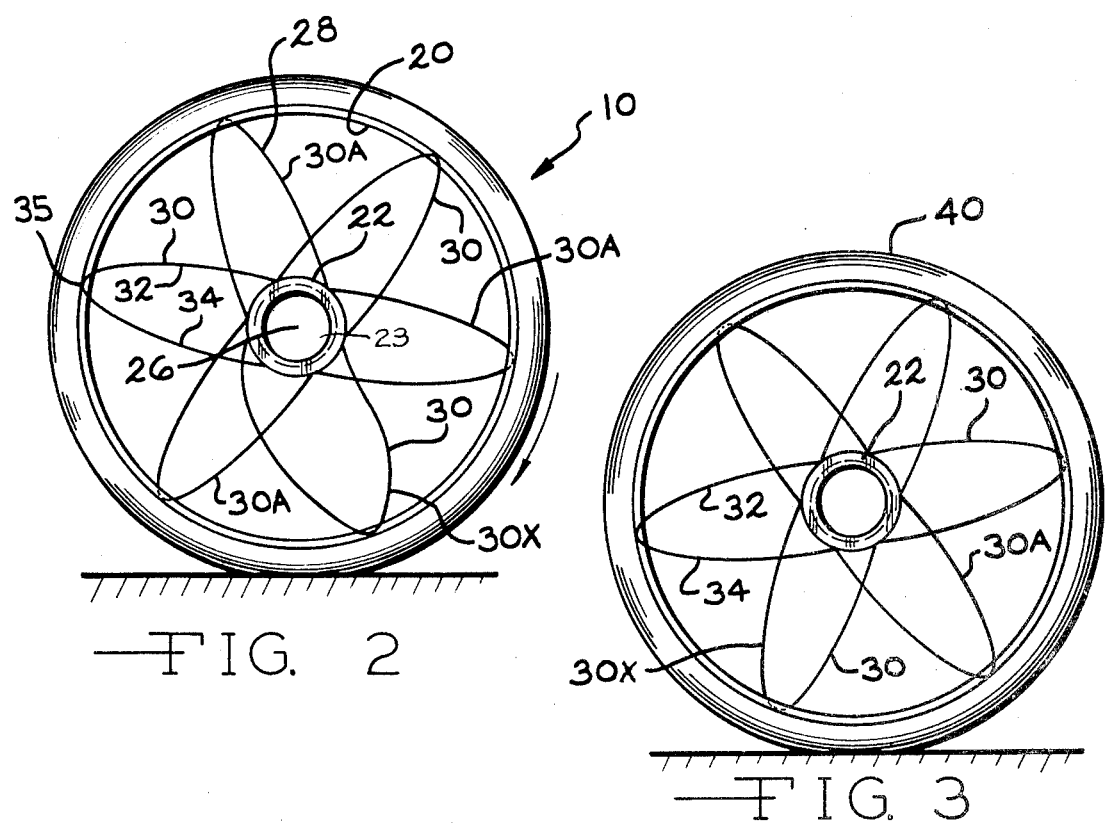
FIG. 2
FIG. 3

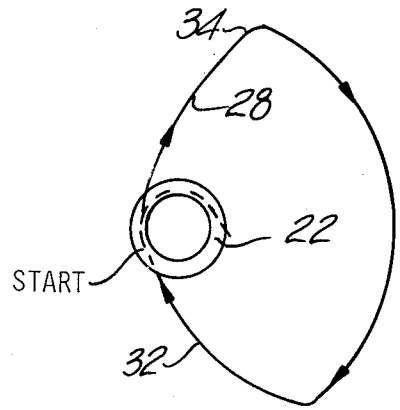
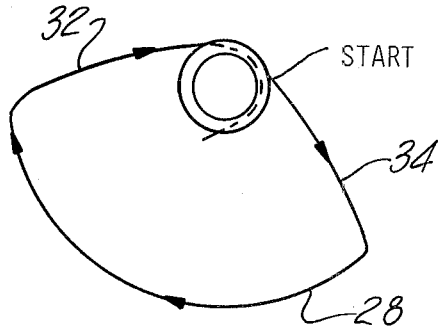
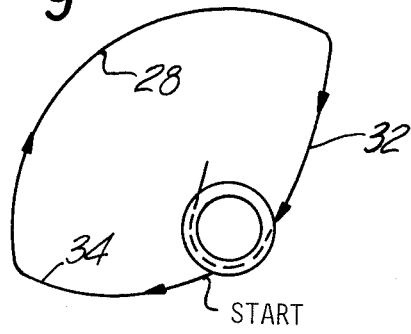
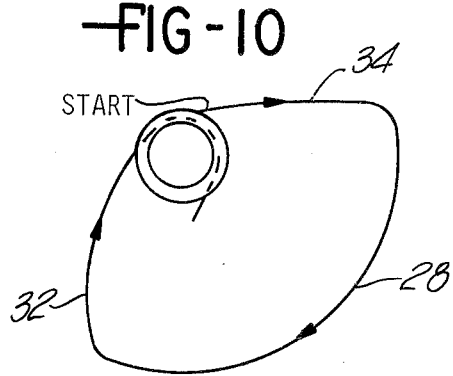
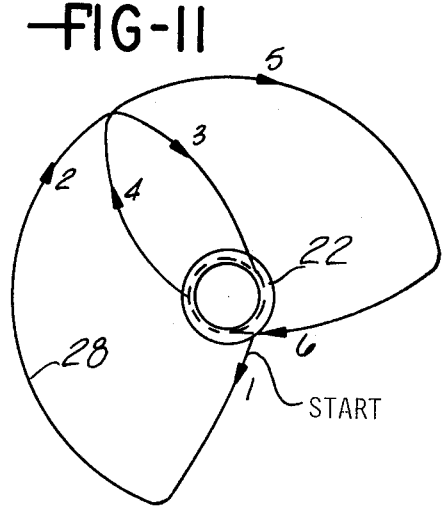
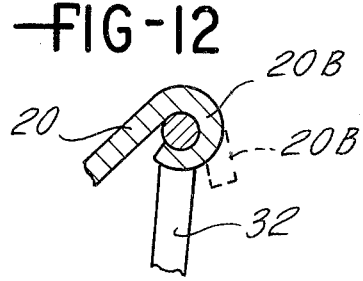

SPOKED WHEEL

CROSS REFERENCE TO RELATING APPLICATION

This application is a continuation-in-part of copending application Ser. No. 905,658, filed May 15, 1978, now abandoned.

BACKGROUND OF THE INVENTION

The present invention relates to spoked wheels such as those found on bicycles, motorcycles, etc. Wheels employing various spoke arrangements are constructed so that each spoke member which extends radially between a hub and rim is tightened in tension so that the hub in effect hangs by those spokes positioned above the hub as the wheel is rolled over a roadway. Consequently, as external forces are applied to the wheel to roll it over a supporting surface, the spokes do not function to lessen the effects of rolling resistance, wind drag and other factors which inhibit the free rolling of the wheel over the roadway.

It is the object of the present invention, therefore, to provide a wheel having a spoke arrangement that stores and releases external energy to add propulsive thrust to the wheel.

SUMMARY OF THE INVENTION

In accordance with the present invention, a wheel is provided and is particularly adapted for use on a cycle or other land vehicle to lessen the effects of those natural physical phenomena which retard the movement of the wheel over a supporting surface, that is, friction, wind drag, etc. The wheel of the present invention consists of an annular rim, a hub member located concentrically within the wheel rim and an energy-translating spoke assembly which includes a coil of wire on the hub that accumulates a portion of the energy of motion of the wheel as it is driven over a roadway and releases this energy at the moment at which it will provide a torque to the wheel in the direction in which the wheel is being rolled.

The spoke assembly is preferably formed from a single strand of specially selected materials such as stainless steel alloys and is capable of storing and releasing the kinetic energy of the rolling wheel by virtue of the atomic bonding in the materials selected. The wire strand is formed to a plurality of spoke loops by wrapping the wire around the hub and extending it in an arcuate path to the rim, thence partially about the rim, and back in an arcuate path to the hub. The wire, when has then formed two spaced spoke sections, is then wound about the hub and then the sequence is repeated enough times to form the desired number of spoke loops. Each spoke loop includes a pair of spoke sections that are curved under a prestressed manufacturing process so as to converge towards each other at the location or juncture where the spoke sections are attached to the wheel rim.

Two sets of spoke loops are provided, each set being spirally wound about the hub. The sets are attached to different circumferential edges of the rim. The spoke loops in one set are staggered with respect to the spoke loops in the other set so that each spoke in one set is located between two adjacent spokes in the other set.

The spokes operate to convert the kinetic energy of rotation of the wheel into potential energy and then at the appropriate position of the wheel with respect to the roadway, the potential energy is released to add a propulsive torque to the wheel. As the wheel engages a supporting surface, the spoke section closest thereto is flexed slightly in response to the impact of the wheel against the surface of the road. The flexing action against the prestressed mounting of the spoke section acts much like a pole vault to convert kinetic energy into potential energy and wind up the spiral coil of spoke wire on the hub. As the portion of the wheel approaches the location at which it will break contact with the supporting surface, the potential energy in the associated spoke is released as it unflexes thereby adding a torque to the wheel in the direction in which it is being rolled. Thus, a portion of the driving energy that would normally be lost is utilized to enable the more efficient use of available power to drive a land vehicle along a roadway.

Further objects, features, and advantages of the present invention will become apparent from a consideration of the following description when taken in connection with the appended claims and the accompanying drawing in which;

FIG. 1 is an elevational view of a bicycle equipped with wheels embodying the present invention;

FIG. 2 is an elevational view of a loaded wheel illustrating the dynamic reaction of the spokes as the wheel is rolled over a supporting surface.

FIG. 3 is an elevational view of the wheel illustrated in FIG. 2, but showing it at a different advanced rotated position;

FIG. 7 is a diagrammatic view illustrating the initial path followed by the wire which forms the spoke assembly during winding of the wire onto the wheel hub and rim;

Figure 4:
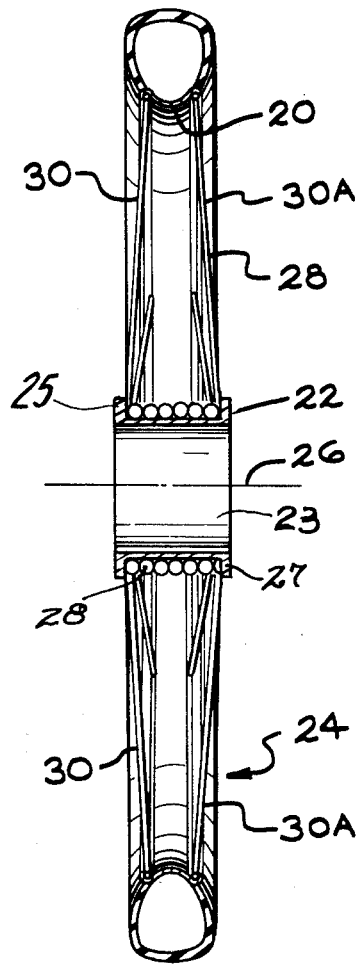
FIG. 4 is a vertical sectional view of the wheel of the present invention.

FIGS. 8-11, inclusive, are views like FIG. 7 showing successive subsequent steps in the process for forming the spoke assembly on the hub and rim; and FIG. 12 is an enlarged fragmentary detail view showing the attachment of the spoke wire to the rim.

With reference to the drawing, the wheel of the present invention, indicated generally at 10, is shown in FIG. 1 as both the front and rear wheels on a bicycle 12. Each wheel 10 functions to convert a portion of the kinetic energy developed when the cycle is powered through manual operation of the pedals 14 into potential energy which is reconverted back to kinetic energy at the appropriate position of the wheel 10 with respect to the roadway to add a torque to the wheel 10. This torque provides the bicycle 12 with a propulsive thrust that offsets those forces which retard the movement of the wheels 10 over the driving surface.

Figure 5:
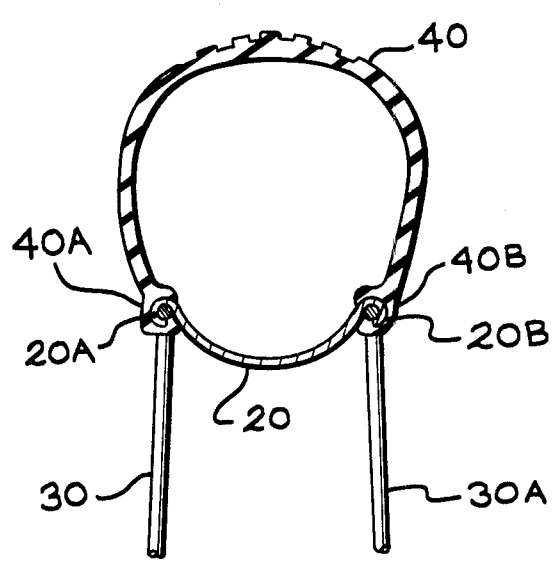
FIG. 5 is an enlarged cross sectional view of the wheel illustrated in FIG. 4 showing the mounting of a tire of the wheel.

Each wheel 10 consists of an annular rim member 20 that is generally circular in shape, a hub member 22 having an internal bore 23 with a longitudinal axis 26, defining the axis of rotation of the wheel 10, and a spoke assembly 24 connecting the hub 22 to the rim 20. The hub 22, positioned concentrically with respect to annular rim member 20, has a flange 25 at one end and a nut 27 threaded on the opposite end for a purpose to appear presently. As seen in FIG. 5, the rim member 20 has a curved cross sectional configuration extending radially inwardly toward the hub 22. The rim member 20 terminates at each edge in curved flanges 20A and 20B that are curved in directions opposite to the curve of the main portion of the rim 20, and are sometimes called felloes 20A and 20B because of their direct connection to the spoke assembly 24.

The spoke assembly 24 is formed from a single strand of wire 28 that is composed of selected materials which exhibit resiliency, that is, if stretched or flexed, the wire 28 returns to its normal position. The wire 28 is initially wrapped around the hub 22, extended to a slot in one of the rim flanges 20A or 20B, as shown in FIG. 12, thence circumferentially along the flange so as to be confined therein in the path shown in FIG. 7, the rim 20, and back to the hub 22. The initial step shown in FIG. 7 thus forms spoke sections 32 and 34 in a pair of spoke loops 30A. The spoke loops 30 extend from the hub 22 to the rim flange 20A and the spoke loops 30A extend from the hub 22 to the rim flange 20B. The wire 28 is wound in a spiral about the hub 22 and the nut 27 is tightened to insure a tight packing of the coils in the spiral against each other between the flange 25 and the nut 27, which is a lock nut. The hub 22 is externally threaded over substantially its entire length so that it can be threaded into and out of the spiral coil of spoke wire 28 that is tightly wound about it.

FIGS. 8 and 9 illustrate the next successive steps in which the wire 28 is shaped to form additional sections 32 and 34 and complete the formation of the loops 30A. FIG. 10 shows the next successive step in which the first sections 32 and 34 in the loops 30 are formed. In each step, the wire 28 enters and leaves a rim flange or felloe 20A or 20B through a slot or notch formed therein as shown in broken lines in FIG. 12. In FIG. 11, the final winding steps for the wire 28 are shown, the wire following the path indicated by the numberals 1-6, inclusive. After the point shown at 6, the wire 28 is wrapped again about the hub 22.

The spoke loops 30 and 30A extend from the hub 22 to circumferentially spaced apart locations on the wheel rim 20. Each loop 30 and 30A consists of a pair of spoke sections 32 and 34 which are prestressed so as to be arcuate converging with each other at the location or juncture where the loop enters or leaves the rim flange.

The spoke loops 30 are staggered with respect to the spoke loops 30A so that as seen in FIG. 2, each spoke loop of one set extends radially from the hub 22 between a pair of adjacent loops in the other set. This staggered alignment evernly distributes the load applied to the wheel 10 and enhances the ability of the wheel 10 to corner. This arrangement also keeps the wheel 10 running straight and is good for wheel alignment.

A tire 40 is shown in FIG. 5 mounted on the rim 20. The tire 40 has inner bead portions 40A and 40B that encapsulate and are bonded to the rim flanges 20A and 20B, respectively, to provide an integral wheel and rim construction.

Figure 6:
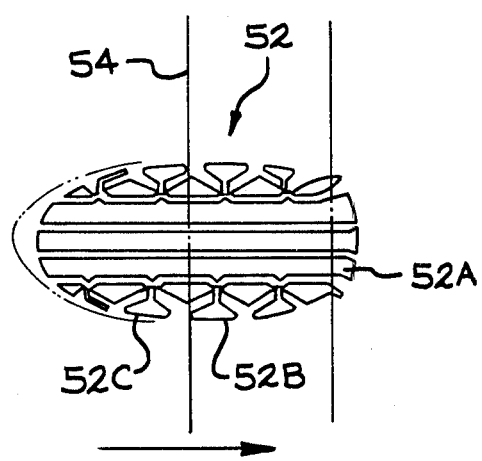
FIG. 6 illustrates a tread print made by the wheel of the present invention on a flat supporting surface.

When the wheel 10 is rolled over a generally flat surface in a left to right direction, as viewed in FIG. 6, it makes a tread print 52 that defines the area of contact between the tire 40 and the roadway surface. The tread print has a front portion 52A, an intermediate portion 52B, and a rear portion 52C. The one 54 is in essential vertical alignment with the axis 26 so that the forward portion 52A and the intermediate portion 52B are located forwardly of this line while the rear portion 52C of the tread print is located rearwardly of the line 54.

With reference to FIGS. 2, 3, and 6, the wheel 10 operates as follows. Assume that the wheel 10 is rolling in the clockwise direction. The dynamic reaction of one of the spoke loops, designated as 30X in FIGS. 2 and 3, will be explained as the wheel 10 is rolled over the roadway, it being understood that the operation of all the loops 30 and 30A is similar. When the portion of the tire 40 closest to the loop 30X engages the ground at the forward portion 52A of the tread print 52, the spoke sections 32 and 34 of loop 30X are flexed somewhat as shown in FIG. 2 causing the spiral coil of wire 28 on the hub 22 to tighten or wind up, thus converting some of the kinetic energy into potential energy. As the wheel 10 rolls further in the clockwise direction to the location shown in FIG. 3, spoke sections 32 and 34 of the loop 30X begin to unflex and the coil on the hub begins to unwind. At this time, the spoke sections are moving behind the axis 26 of the wheel so as to create a clockwise torque on the wheel 10. This unflexing represents the transformation of the potential energy in the wire 28 to kinetic energy. It is also due in part to the action of the bonds between the atoms which make up the spokes, which action is best explained by the quantum mechanics theory. This action effects a push off that develops a torque in the clockwise direction adding a propulsive thrust to the wheel 10.

With reference to FIG. 6, the deformation of each spoke section 32 and 34 of the loop 30X can be further understood. As the portion of the tire 40 makes contact with the surface at the front portion 52A of the tread print 52, the spoke loops 30 or 30A nearest that portion of the tire 40 will begin to flex stressing the wire coil on the hub 22. Flexing of the loop 30 continues as the tire 40 moves through the intermediate portion 52B of the tread print 52. Push off caused by the unflexing of the spoke loop 30 will then begin as the tire 40 moves into the rear tread print portion 52C and reaches a maximum as the tire 40 breaks contact with the surface. This flexing and unflexing action is repeated for each spoke loop 30 and 30A as the wheel 10 is rolled on the roadway.

From the above description, it can be seen that an improved wheel 10 is provided having a spoke arrangement that operates to transform kinetic energy into potential energy as the wheel 10 rolls over a surface and at the appropriate time releases this potential energy to add a propulsive torque to the wheel 10. The use of a single strand of wire for the spoke loops ensures proper interaction between the spoke loops 30 and 30A during the rolling of the wheel 10. Any number of loops 30 and 30A can be employed in the wheel 10 so long as the loops 30 are equal in number to the loops 30A.

What is claimed:

1. A wheel comprising an annular wheel rim member of generally circular shape, a hub member positioned concentrically within said wheel rim member, and energy-transferring spoke means connecting said hub member with said wheel rim member, said spoke means comprising a continuous length of wire formed into a plurality of interconnected spoke members extending radially from said hub member to circumferentially spaced apart locations on said rim member, said length of wire being wound in a tight spiral coil about said hub member and being wound partially about said rim member between adjacent ones of said spoke members, said spoke members being of arcuate shape between said hub and rim members so that the spoke member can flex in response to engagement of the portion of the wheel adjacent thereto with a supporting surface on which said wheel is rolled to thereby tighten said spiral coil, and so that said spoke members can unflex to impart a torque on said wheel when the portion of the wheel adjacent thereto approaches a position breaking contact with said supporting surface.

2. A wheel according to claim 1 wherein each of said spoke members comprises a pair of arcuate spoke sections converging at the location of support of said spoke member on said wheel rim member to define a loop, a preselected number of said spoke members forming one set of spoke loops, the remaining spoke members forming a second set of spoke loops circumferentially between said first set of spoke loops and being equal in number to said preselected number, the spoke loops of one set being staggered with respect to the spoke loops to the other set so that each spoke loop of one set extends radially outwardly from said hub member between a pair of spoke loops from the other set.

3. A wheel according to claim 2 wherein said hub member is externally threaded, said wire is wound around said hub member, flange means on said hub member at one end, and nut means on said hub member advanceable toward said flange means to compress the coils of wire on said hub member therebetween.

4. A wheel according to claim 3 wherein said wheel rim member has opposing edge portions to which said spoke loops are connected, each of said edge portions having a return bent-upon-itself flange in which said length of wire is confined at a position between said spoke members.

5. A wheel according to claim 4 wherein said tire is bonded at the inner edges thereof to said rim edge portions so as to substantially encapsulate said edge portions.

* * * * *